(12) United States Patent
Zheng et al.

(10) Patent No.: US 9,446,853 B2
(45) Date of Patent: Sep. 20, 2016

(54) METHOD AND APPARATUS FOR MONITORING THE WING ANTI-ICING VALVE

(71) Applicant: AIR CHINA LIMITED, Beijing (NC)

(72) Inventors: Fengliang Zheng, Beijing (CN); Zhuping Gu, Beijing (CN); Jiaju Wu, Beijing (CN); Lei Huang, Beijing (CN); Yi Zhu, Beijing (CN); Minjie Tang, Beijing (CN); Yi Shu, Beijing (CN)

(73) Assignee: Air China Limited, Beijing (CN)

( * ) Notice: Subject to any disclaimer, the term of this patent is extended or adjusted under 35 U.S.C. 154(b) by 114 days.

(21) Appl. No.: 14/339,346

(22) Filed: Jul. 23, 2014

(65) Prior Publication Data
US 2016/0185464 A1    Jun. 30, 2016

(30) Foreign Application Priority Data
Jul. 24, 2013 (CN) .......................... 2013 1 0314377

(51) Int. Cl.
*B64D 15/20* (2006.01)
*B64D 45/00* (2006.01)

(52) U.S. Cl.
CPC ............... *B64D 45/00* (2013.01); *B64D 15/20* (2013.01); *B64D 2045/0085* (2013.01)

(58) Field of Classification Search
CPC ...................................................... B64D 15/20
USPC ...................................................... 244/134 F
See application file for complete search history.

(56) References Cited

U.S. PATENT DOCUMENTS

| 5,033,012 A * | 7/1991 | Wohld ...................... G07C 3/04 |
| | | 702/41 |
| 5,329,956 A * | 7/1994 | Marriott .................. F16K 17/04 |
| | | 137/15.01 |
| 7,987,108 B2 * | 7/2011 | Wetzer ............... G02B 23/0283 |
| | | 361/725 |

FOREIGN PATENT DOCUMENTS

EP     2273168 A2 *  1/2011  ......... F16K 37/0083

OTHER PUBLICATIONS

European Search Report for application No. 14178431.4 dated Dec. 10, 2014, 7 pages.

* cited by examiner

*Primary Examiner* — Justin Benedik
(74) *Attorney, Agent, or Firm* — Husch Blackwell LLP

(57) ABSTRACT

The present invention relates to a system for monitoring the wing anti-icing valve, comprising: time record device configured to record the time for opening or closing the anti-icing valve; data acquisition device configured to obtain the time for opening or closing the anti-icing valve recorded by the time record device; and message generation device configured to generate the anti-icing valve performance message according to the time for opening or closing the anti-icing valve obtained by the data acquisition device.

29 Claims, 14 Drawing Sheets message <034>

|    | A/C ID | FROM | TO | FLT | DATE UTC |
|----|--------|------|----|----|----------|
|    | Aircraft No. | Taking Off | Landing | Flight No. | UTC Time |
| CC | aaaa | aaaa | aaaa | aaaa | aaaa |
|    | PH | CNT | CODE | APU | BLEED STATUS |
|    | Flight Phase | Count | Trigger Code | APU Bleed Air Valve | Status of Bleed Air Valve |
| CI |    |    |    |    |    |
|    | TAT | ALT | CAS | MN | GW | CG | DMU |
|    | Total Temperature | Standard Height | Computed Airspeed | Match Number | Total Weight | Center of Gravity | DMU Edition |
| CE |    |    |    |    |    |    | 1---- |
|    | ESN | EHRS | ECYC |
|    | Serial No. | Hours | Circulation |
| EC | 011920 | 23424 | 13636 |
| EE | 012143 | 21649 | 13291 |

5S PRE WAV P/B PUSHED IN

|    | PD | TPO | WAV | DATE TIME |
|----|------|------|-----|------------|
|    | Pressure of Bleed Air | Temperature of Bleed Air | Status of Anti-icing Valve | Record Time of Data |
| S1 | 25 | 182 | CLOSE | FEB21,145406 |
| S2 | 25 | 182 | CLOSE |    |

5S POST WAV P/B PUSHED IN

|    | PD | TPO | WAV | DATE TIME |
|----|----|-----|-----|-----------|
| S3 | 29 | 181 | OPEN | FEB21,145416 |
| S4 | 29 | 181 | OPEN |    |

EVENT AT WAV P/B PUSHED OFF

|    | PD | TPO | WAV | DATE TIME |
|----|----|-----|-----|-----------|
| S5 | 31 | 189 | OPEN | FEB21,145546 |
| S6 | 30 | 192 | OPEN |    |

TIME WAV FROM OPEN TO CLOSE

|    | WAV1_TMR | WAV2_TMR | DATE TIME |
|----|----------|----------|-----------|
|    | Time for Closing the Left Valve | Time for Closing the Left Valve | Record Time of Data |
| S7 | 2.3750 | 8.6875 | FEB21,145556 |

Fig. 6

METHOD AND APPARATUS FOR MONITORING THE WING ANTI-ICING VALVE

TECHNICAL FIELD

The present invention relates to an airborne system and method, in particular, to a system and method for monitoring the wing anti-icing valve.

BACKGROUND

An aircraft may be frozen due to a low temperature when the aircraft is flying at high altitudes. In the icing conditions, if the aerodynamic sensitive part of the wing, for example the leading edge, is frozen, the aerodynamic shape of the wings will be influenced. The wings might stall due to freezing and the flight safety will be threatened. Therefore, in order to prevent the sensitive parts, such as the leading edges of the wings and the like, from freezing, the pneumatics system of the aircraft provides hot air to the slats of the wings to remove the ice and prevent freezing.

The wing anti-icing valves control the opening and closing of the hot air piping and ensure that the pressure of downstream of the piping is within a certain operating range. The reliability of the anti-icing valves greatly affects the flight safety. Once there is failure in the anti-icing valve, the aircraft operation will be influenced. Even if the artificial operation may be applied, the flight is still easily to be delayed. Therefore, monitoring the performance of the anti-icing valves may help improving the reliability of the aircraft and reduce the running cost.

SUMMARY

For the above technical problem existing in the prior art, there is provided, according to one aspect of the present invention, a system for monitoring the wing anti-icing valve, comprising: time record device configured to record the time for opening or closing the anti-icing valve; data acquisition device configured to obtain the time for opening or closing the anti-icing valve recorded by the time record device; and message generation device configured to generate the anti-icing valve performance message according to the time for opening or closing the anti-icing valve obtained by the data acquisition device.

For the system described above, wherein the time record device comprises a timer configured to record the time from the timing of that the WING switch is turned from the press-in position to the press-out position to the timing of that the anti-icing valve is in the closing position.

For the system as described above, wherein the anti-icing valve comprises a sensor configured to detect whether the anti-icing valve is in the open state; wherein the time record device comprises a timer configured to record the time from the timing of that the WING switch is turned from the press-out position to the press-in position to the timing of that the anti-icing valve is in the opening position.

For the system as described above, wherein the time record device records the timings of that the WING switch is turned from the press-in position to the press-out position and the anti-icing valve is in the closing position or the timings of that the WING switch is turned from the press-out position to the press-in position and the anti-icing valve is in the opening position.

The system as described above further comprises anti-icing valve performance assessment device configured to receive the anti-icing performance message and assess the performance of the anti-icing valve according to the time for opening or closing the anti-icing valve in the anti-icing valve message.

For the system as described above, wherein the anti-icing valve performance assessment device refers to the history data of the time for opening or closing the anti-icing valve at the same time.

For the system as described above, wherein the anti-icing valve performance assessment device estimates the failure time of the anti-icing valve.

The system as described above further comprises communication device configured to transmit the anti-icing valve message to the anti-icing valve performance assessment device.

For the system as described above, wherein the anti-icing valve message comprises the revised time for opening or closing the anti-icing valve, the revision formula is as follows: the revised time=the time before being revised+(a*(PD)+b); wherein PD refers to the bleed air pressure, a and b are revised parameters.

As described above, wherein the anti-icing valve message comprises: the state before the WING switch being pressed-in, the state after the WING switch being pressed-in, the state when the WING switch is pressed-out and the time for closing the anti-icing valve; or, comprises: the state before the WING switch being pressed-in, the state after the WING switch being pressed-in and the time for opening; wherein the state at least comprises the bleed air pressure of the engine.

For the system as described above, wherein the anti-icing valve performance assessment device determines whether the revised time for opening or closing the anti-icing valve is greater than the first threshold or the second threshold; wherein, the second threshold is greater than the first threshold.

For the system as described above, wherein the anti-icing valve performance assessment device determines whether the revised time for opening or closing the anti-icing valve is changed substantially compared with the history data.

For the system as described above, wherein the anti-icing valve performance assessment device determines whether the revised time for opening or closing the anti-icing valve is changed substantially compared with the history data by examining independent samples.

For the system as described above, wherein the anti-icing valve performance assessment device determines whether the revised time for opening or closing the anti-icing valve is changed substantially compared with the history data by the changing trend of the linear fitting slope.

There is provided, according to another aspect of the present invention, a method for monitoring the wing anti-icing valve, comprising: recording the time for opening or closing the anti-icing valve; obtaining the time for opening or closing the anti-icing valve recorded by the time record device; and generating the anti-icing valve message according to the time for opening or closing the anti-icing valve obtained by the data acquisition device.

For the method as described above, wherein recording the time for closing the anti-icing valve comprises recording the time from the timing of that the WING switch is turned from the press-in position to the press-out position to the timing of that the anti-icing valve is in the closing position.

For the method as described above, wherein recording the time for opening the anti-icing valve comprises recording the time from the timing of that the WING switch is turned from the press-out position to the press-in position to the timing of that the anti-icing valve is in the opening position.

The method as described above further comprises recording the timings of that the WING switch is turned from the press-in position to the press-out position and the anti-icing valve is in the closing position or the timings of that the WING switch is turned from the press-out position to the press-in position and the anti-icing valve is in the opening position.

The method as described above further comprises receiving the anti-icing valve performance message and assessing the performance of the anti-icing valve according to the time for opening or closing the anti-icing valve in the anti-icing valve performance message.

The method as described above further comprises referring to the history data of the time for opening or closing the anti-icing valve.

The method as described above further comprises estimating the failure time of the anti-icing valve.

The method as described above further comprises transmitting the anti-icing valve performance message by air-ground data link.

The method as described above further comprises revising the time for opening or closing the anti-icing valve, wherein the revision formula is as follows: the revised time=the time before being revised+(a*(PD)+b); wherein PD refers to the bleed air pressure, a and b are revised parameters.

For the method as described above, wherein the anti-icing valve message comprises: the state before the WING switch being pressed-in, the state after the WING switch being pressed-in, the state when the WING switch is pressed-out and the time for closing the anti-icing valve; or, comprises: the state before the WING switch being pressed-in, the state after the WING switch being pressed-in and the time for opening; wherein the state at least comprises the bleed air pressure of the engine.

The method as described above, wherein the step of assessing the performance of the anti-icing valve comprises determining whether the revised time for opening or closing the anti-icing valve is greater than the first threshold or the second threshold; wherein, the second threshold is greater than the first threshold.

The method as described above, wherein the step of assessing the performance of the anti-icing valve comprises determining whether the revised time for opening or closing the anti-icing valve is changed substantially compared with the history data.

The method as described above, wherein the step of determining whether the revised time for opening or closing the anti-icing valve is changed substantially compared with the history data comprises determining whether the revised time for opening or closing the anti-icing valve is changed substantially compared with the history data by examining independent samples.

The method as described above, wherein the step of determining whether the revised time for opening or closing the anti-icing valve is changed substantially compared with the history data comprises determining whether the revised time for opening or closing the anti-icing valve is changed substantially compared with the history data by the changing trend of the linear fitting slope.

The method as described above, wherein the anti-icing valve performance message comprises the time for closing the anti-icing valve, wherein the step of generating the anti-icing valve performance message comprises; determining whether the wing anti-icing system has already worked properly; collecting the state before the WING switch being pressed-in and the state after the WING switch being pressed-in; collecting the state when the WING switch is pressed-out in response to that the WING switch is turned from the press-in position to the press-out position; obtaining the time for closing the anti-icing valve; and generating the anti-icing valve performance message.

For the method as described above, wherein the step of determining whether the wing anti-icing system has already worked properly comprises: determining: (1) whether the WING switch is held at the ON position; (2) whether the pressure of the bleed air piping is greater about 15 psi; (3) whether the position of the anti-icing valve is shown being at the "non-closing" position; and (4) whether the lasting time is greater than about 5 seconds.

The method as described above further comprises: determining there is failure in the valve in response to that the time for closing the anti-icing valve is greater than about 30 seconds.

There is provided, according to another aspect of the present invention, a method for maintaining the wing anti-icing valve, comprising: obtaining one or more anti-icing valve performance messages, wherein, the anti-icing valve performance message comprises the time for opening or closing the anti-icing valve; assessing the performance of the wing anti-icing valve; arranging the maintenance plan of the anti-icing valve; and maintaining the wing anti-icing valve.

BRIEF DESCRIPTION OF DRAWINGS

Hereinafter, preferred embodiments of the present invention will be further described with reference to the accompany drawings, wherein:

FIG. 6 is an example of the anti-icing valve performance message according to one embodiment of the present invention;

DETAILED DESCRIPTION

Figure 1:
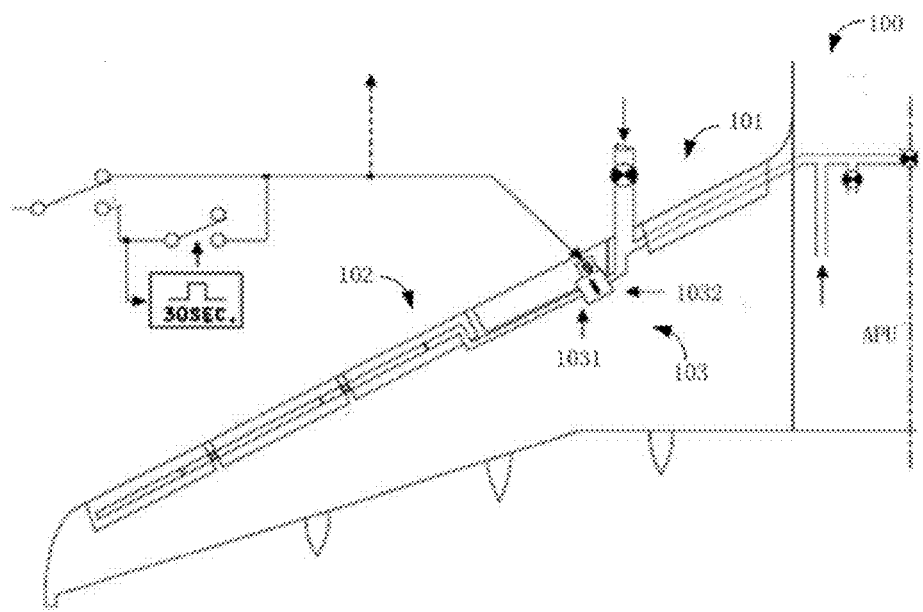
FIG. 1 is a schematic illustrating the structure of a wing anti-icing system in the aircraft.

Hereinafter, in order to give a clearer picture of the purposes, technical solutions and advantages of the embodiments of the present invention, the technical solutions in the embodiments of the present invention will be further described, taken in conjunction with the accompanying drawings in the embodiments of the present invention. Apparently, the described embodiments are only a part of the embodiments rather than all embodiments of the present invention. Based on the embodiments in the present invention, all other embodiments a person with ordinary skill in the art achieves without any creative effort shall fall within the protection scope of the present invention.

In the following detailed description, reference is made to the accompanying drawings, which form a part of the present application to illustrate specific embodiments of the application. In the drawings, similar symbols in different drawings identify substantially similar components. With the following detailed description about each specific embodiment of the present application, an ordinary person with relevant knowledge and technology in the art will be able to implement technical solutions of the present application. It should be appreciated that other embodiments may be utilized or changes in structure, logic or electrical property may be made to the embodiments of the present application.

FIG. 1 is schematic illustrating the structure of a wing anti-icing system in the aircraft. The anti-icing system shown is in the aircraft of Airbus A320 as an example and the systems in other aircrafts are similar in principle. The anti-icing system 100 comprises an upstream pipe 101 and a downstream pipe 102 and an anti-icing valve 103 therebetween. The upstream pipe 101 is attached to the air source to provide hot air for the downstream pipe 102. As shown, the air source may be the APU or engine of the aircraft. The downstream piping 102 may be provided with a plurality of openings to provide hot air for the slats. The anti-icing valve 103 is an electro-pneumatic valve, comprising a magnetic valve 1031 and a pressure control shut off valve 1032 in addition to the valve. The pressure control shut off valve 1032 comprises a valve actuation cavity. When the magnetic valve 1031 is powered-off, the valve actuation cavity of the pressure control shut off valve 1032 is open to the atmosphere, and thus there is no pressure difference between the valve actuation cavity and the downstream pipe and the valve in the valve actuation cavity is kept closed under the pressure of the spring. When the magnetic valve 1031 is powered-on, the magnetic valve is opened, a pressure difference between the upstream pipe and the downstream pipe is established, and the pressure of the valve actuation cavity pushes the valve to be opened. Meanwhile, the control cavity of the pressure control shut off valve 1032 detects the pressure difference between the upstream and downstream of the valve and dynamically adjusts the pressure within then actuation cavity, to keep the pressure in the downstream pipe of the valve within the recommended limits.

Figure 2:
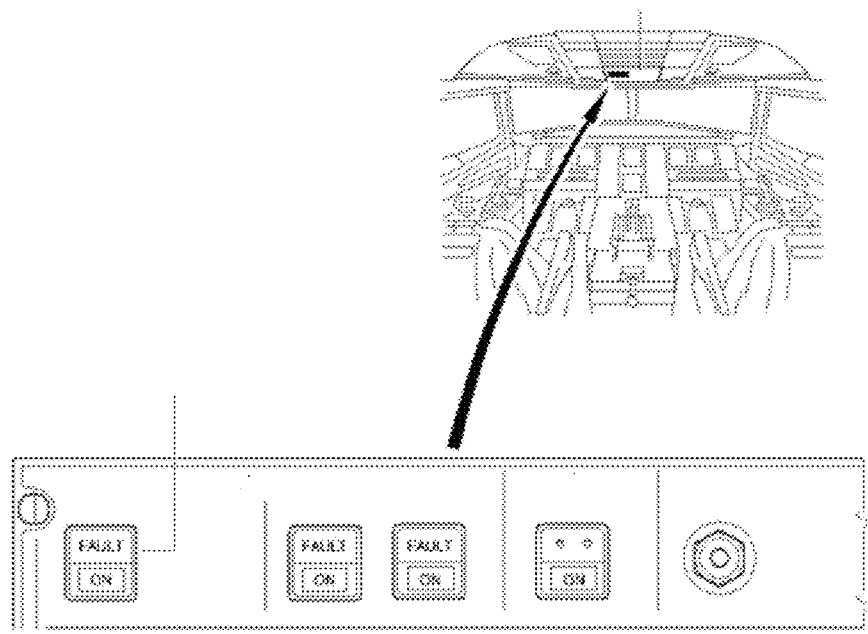
FIG. 2 is a schematic illustrating the control instructions of the aircraft anti-icing valve.

FIG. 2 is a schematic illustrating the control indication of the aircraft anti-icing valve. As shown in FIG. 2, the top of the cockpit have an anti-icing operation panel. The wing anti-icing switch WING is at the left-most side of the anti-icing operation panel. The wing anti-icing switch WING may be at two positions: press-out position and press-in position. When WING is at the press-out position, the magnetic valve 1031 is powered-off, and the anti-icing valve is kept at the closing position. At that time, the position switch at the closing position provides the position state of the valve indicating that the valve is at the closing position. When WING is at the press-in position, the magnetic valve 1031 is powered-on, and the anti-icing valve is opened. In addition, the anti-icing valve is also provided with a low pressure switch and a high pressure switch. When the pressure in the downstream piping is too low or too high, a warning will be sent out. Furthermore, if the anti-icing valve is opened or closed without any instruction, opened or closed without according to the instruction or the time for opening or closing is too long, the warning will also be sent out.

Figure 3:
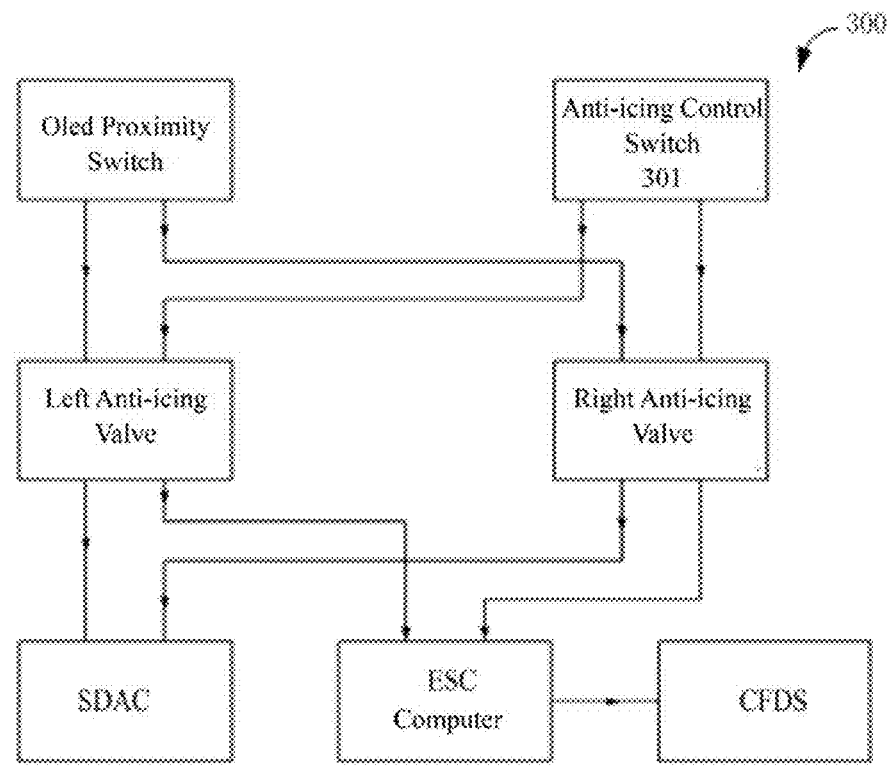
FIG. 3 is a schematic illustrating the control system of the aircraft anti-icing switch.

FIG. 3 is a schematic illustrating the control system of the aircraft anti-icing switch. As shown in FIG. 3, the control system 300 comprises an anti-icing control switch 301, i.e., WING switch. The anti-icing control switch 300 also comprises oled proximity switches 304 configured to limit the operating time of the anti-icing valve on the ground within 30 seconds only for the purpose of ground testing. The control system 300 comprises System Data Acquisition Concentrator (ASAC) computer used for handling the instruction of the cockpit and Environmental Control System (ECS) computer used for recording the failure information and sending it to the Centralized Fault Display System (CFDS).

Figure 4:
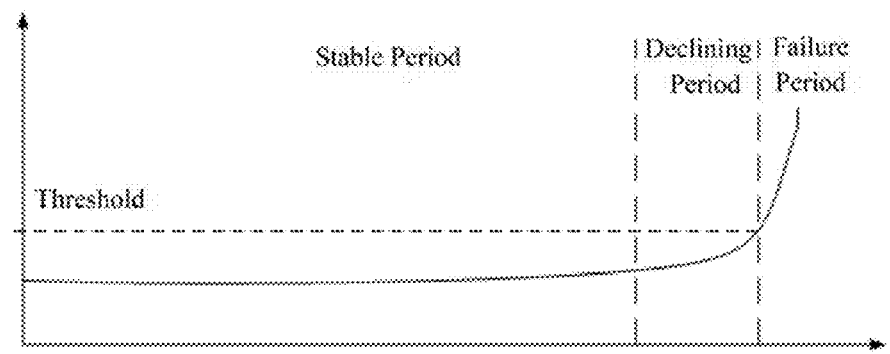
FIG. 4 is a schematic illustrating the changing curve of the performance of the anti-icing valve according to one embodiment of the present invention.

FIG. 4 is a schematic illustrating the curve of the performance of the anti-icing valve according to one embodiment of the present invention. The performance of the anti-icing valve gradually becomes worse, i.e., its declining index gradually increases, with the use time increases. The declining index refers to the speed of which the performance of the anti-icing valve becomes worse. When the declining index is relatively stable, the performance of the anti-icing valve is in the stable period; when the declining index gradually increases, the performance of the anti-icing valve enters into the declining period; when the declining index exceeds a certain threshold, the performance of the anti-icing valve enters into the failure period and the anti-icing valve is ready to be in failure. After the anti-icing valve enters into the failure period, the unfavorable effects will be generated on the service quality and flight safety, and unplanned maintenances will be easily caused and thus renders the flight delay and cancellation.

There is no means for detecting whether the performance of the anti-icing valve enters into the declining period in the prior art. The merits of detecting the declining period are as follows: first, the failure probability of the anti-icing valve is still very low during its declining period, and thus the flight safety and service quality can be ensured if the aircraft is maintained at that time; secondly, after it is detected that the anti-icing valve is in its declining period, the airline company may arrange the aircraft maintained duly, and thus the unplanned maintenance will be avoided and the flight delay may be reduced. Meanwhile, the waste of costs caused by the detection and maintenance according to the hard deadline may also be avoided.

Since the anti-icing valve is an electro-pneumatic mechanical part, its failure comprises opening or closing failure and too long time for opening or for closing. The main fault reasons are aging of inner diaphragm, pollution of air piping, component wear and the like. Therefore, the performance of the valve may be assessed by monitoring the performance of the anti-icing valve and recording the time for opening and closing the valve.

Figure 5:
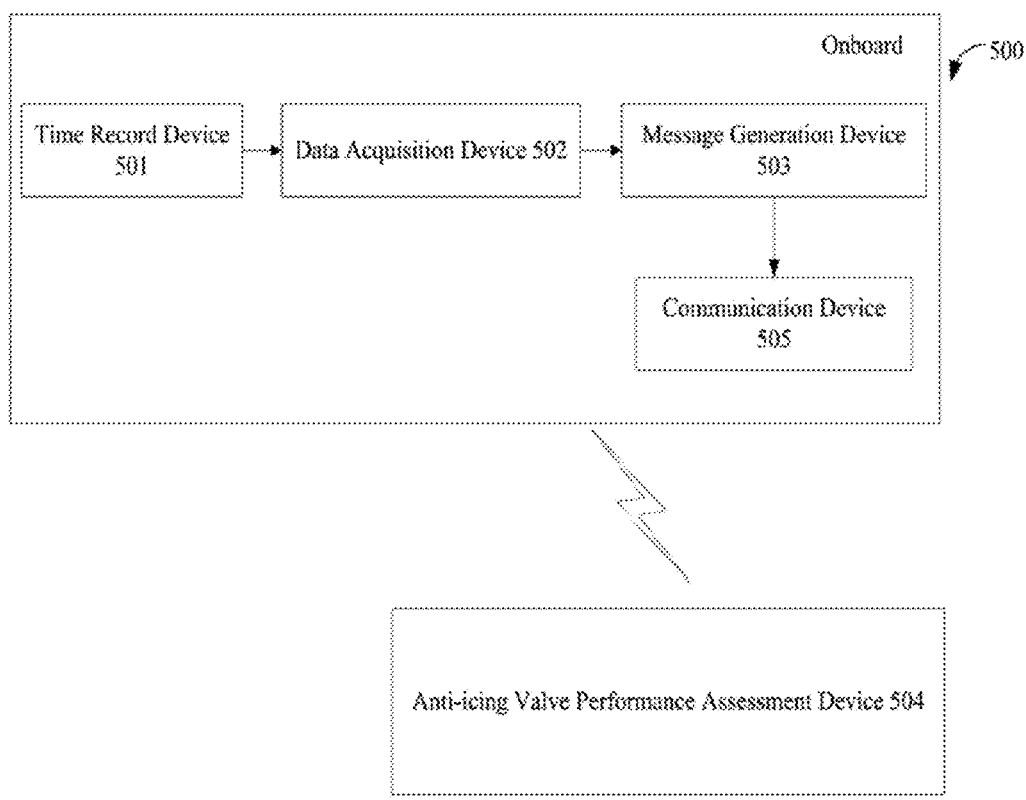
FIG. 5 is a schematic illustrating the monitoring system of wing anti-icing valve according to one embodiment of the present invention.

FIG. 5 is a schematic illustrating the monitoring system of wing anti-icing valve according to one embodiment of the present invention. As shown in FIG. 5, the monitoring system 500 of wing anti-icing valve comprise: time record device 501, data acquisition device 502 and message generation device 503. The time record device 501 is configured to record the time for opening or closing the anti-icing valve. The data acquisition device 502 is configured to obtain the time for opening or closing the anti-icing valve recorded by the time record device 501. The message generation device 503 is configured to generate the anti-icing valve performance message according to the time for opening or closing the anti-icing valve obtained by the data acquisition device 502.

Since both the required time to open the anti-icing valve and the time required to close the anti-icing valve can reflect the performance of the anti-icing valve, therefore, according to one embodiment of the present invention, an example of the time record device 501 is a timer which alternatively records the time for opening or closing the anti-icing valve. As described above, when the anti-icing valve is at its closing position, the status that the anti-icing valve has been at its closing position is sensed (and reported) by a sensor, for example, a micro-switch. Therefore, the timer may be used for recording the duration from the time at which the WING switch is turned from the press-in position to the press-out position to the time at which the anti-icing valve arrives at its closing position, i.e., the time for closing the anti-icing valve, to reflect the performance of the anti-icing valve.

According to one embodiment of the present invention, if the time for opening the anti-icing valve is desire, the aircraft need to be provided with a sensor for reporting that the anti-icing valve has been in its open state. As such, the performance of the anti-icing valve may also be reflected by a timer for recording the duration from the time at which the WING switch is turned from the press-out position to the press-in position to the time at which the anti-icing valve is in the opening position, i.e., the time for opening the anti-icing valve.

According to one embodiment of the present invention, the time record device 501 records the timings of that the WING switch is turned from the press-in position to the press-out position and the anti-icing valve is in the closing position or the timings of that the WING switch is turned from the press-out position to the press-in position and the anti-icing valve is in the opening position. According to one embodiment of the present invention, the WING switch is configured, at timing of that the WING switch is turned from the press-in position to the press-out position or from the press-out position to the press-in position, and the anti-icing valve is configured, at the timing of that the anti-icing valve is at the closing position or the opening position, to send signals to the time record device 501. The time record device 501 records the timings of receiving these signals.

According to one embodiment of the present invention, the present application may utilize the aircraft message system, mainly relate to the Flight Data Interface and Management Unit (FDIMU). FDIMU receives data of the aircraft state from the onboard sensor and other device. The data acquisition sub-system of FDIMU will convert the data of aircraft state acquired to data signal for broadcasting. The Quick Access Recorder (QAR) receives the data of aircraft state broadcasted and save it. Wherein, a part of data is saved in the Flight Data Recorder (FDR), i.e., black box, to be provided to relevant staff for investigation and analysis when a sudden event occurs on the aircraft.

Aircraft Condition Monitoring System (ACMS) also receives the broadcasted aircraft state data from the data acquisition sub-system of FDIMU. The ACMS monitors, collects and records the state data of the aircraft, and output the predetermined state data of the aircraft under certain trigger conditions for the flight and air crew to monitor the state and performance of the aircraft. Since the content and form of the output data may be altered by the users, it is also called message.

The generation of the message of ACMS is controlled by integrated application software. The message is triggered by the logic of threshold of a specific state parameter of aircraft or the combination of a plurality of specific state parameters, i.e., specific message trigger logic. The message of ACMS generated by the message trigger logic designed and tested by the ACMS manufacture is called the basic message. Many basic messages have become the standards of the civil air management department. Take Airbus A320 as an example, there are about 20 basic messages used therein.

The customized message may be generated by writing their own message trigger logic of ACMS, by which the persons skilled in the art will not be limited by the parameters in the basic message and directly obtain thousands of state parameters of aircraft. Thus, the aircraft state may be better monitored.

According to one embodiment of the present invention, an example of the data acquisition device 502 is DMU, OAR or FOR of the FDIMU or a separate hardware volatile or non-volatile data memory device. According to one embodiment of the present invention, the time record device 501 and the data acquisition device 502 may be integrated into one hardware entity or two functionalities of one hardware entity.

According to one embodiment of present invention, an example of the message generation device 503 is the ACMS of the FDIMU or other airborne message generation device. According to one embodiment of the present invention, the time record device 501, the data acquisition device 502 and the message generation device 503 may be integrated into one hardware entity or various functionalities of one hardware entity.

According to one embodiment of the present invention, the monitoring system 500 of the wing anti-icing valve further comprises anti-icing valve performance assessment device 504. The anti-icing valve performance assessment device 504 is configured to receive the anti-icing performance message, assess the performance of the anti-icing valve according to the duration for opening or closing the anti-icing valve in the anti-icing valve message or by additionally referring to the history data of the time for opening or closing the anti-icing valve, and estimate when a failure of the anti-icing valve might occur.

According to one embodiment of the present invention, an example of the anti-icing valve performance assessment device 504 is ground computing platform of the airline or the airborne computing platform.

According to one embodiment of the present invention, the monitoring system 500 of the wing anti-icing valve further comprises communication device 505. The communication device 505 is configured to transmit the anti-icing valve message to the anti-icing valve performance assessment device 504. According to one embodiment of the present invention, an example of the communication is accomplished through air-ground data link such as ACARS system, by which the anti-icing valve performance message is transmitted to the ground station and further transmitted to the ground computing platform or server of the airline.

FIG. 6 is an example of the anti-icing valve performance message according to one embodiment of the present invention. As shown in FIG. 6, the anti-icing valve performance message comprises three parts: the first part relates to the determined parameters, such as aircraft number, flight number, APU bleed air valve, state of bleed air valve, trigger code, time for triggering message and the like, wherein the trigger code refers to whether the anti-icing valve is opened on the ground or in the air, by which it may be determined that whether it is a ground testing, and the time for triggering message refers to the timing of that the WING switch is pressed-in. The second part relates to state parameters, including the state of the WING switch at the 5th second before being pressed-in, the state of the WING switch at the 5th second after being pressed-in, and the state of the WING switch when it is pressed-out, wherein the state parameter thereof comprises: PD: pressure of the engine bleed air, TPO: temperature of the engine bleed air, WAV: position of wing anti-icing valve (OPEN/CLOSE), DATE: UTC date and TIME: UTC time. The third part relates to the time for opening or closing the left and right anti-icing valves and date and time.

Hereinafter, the technical solution of the present invention will be further illustrated by the embodiment of recording the time for closing the anti-icing valve. It should be understood that the technical solution of recording the time for opening the anti-icing valve may also be similarly achieved by persons skilled in the art within the scope of the present invention.

Figure 7:
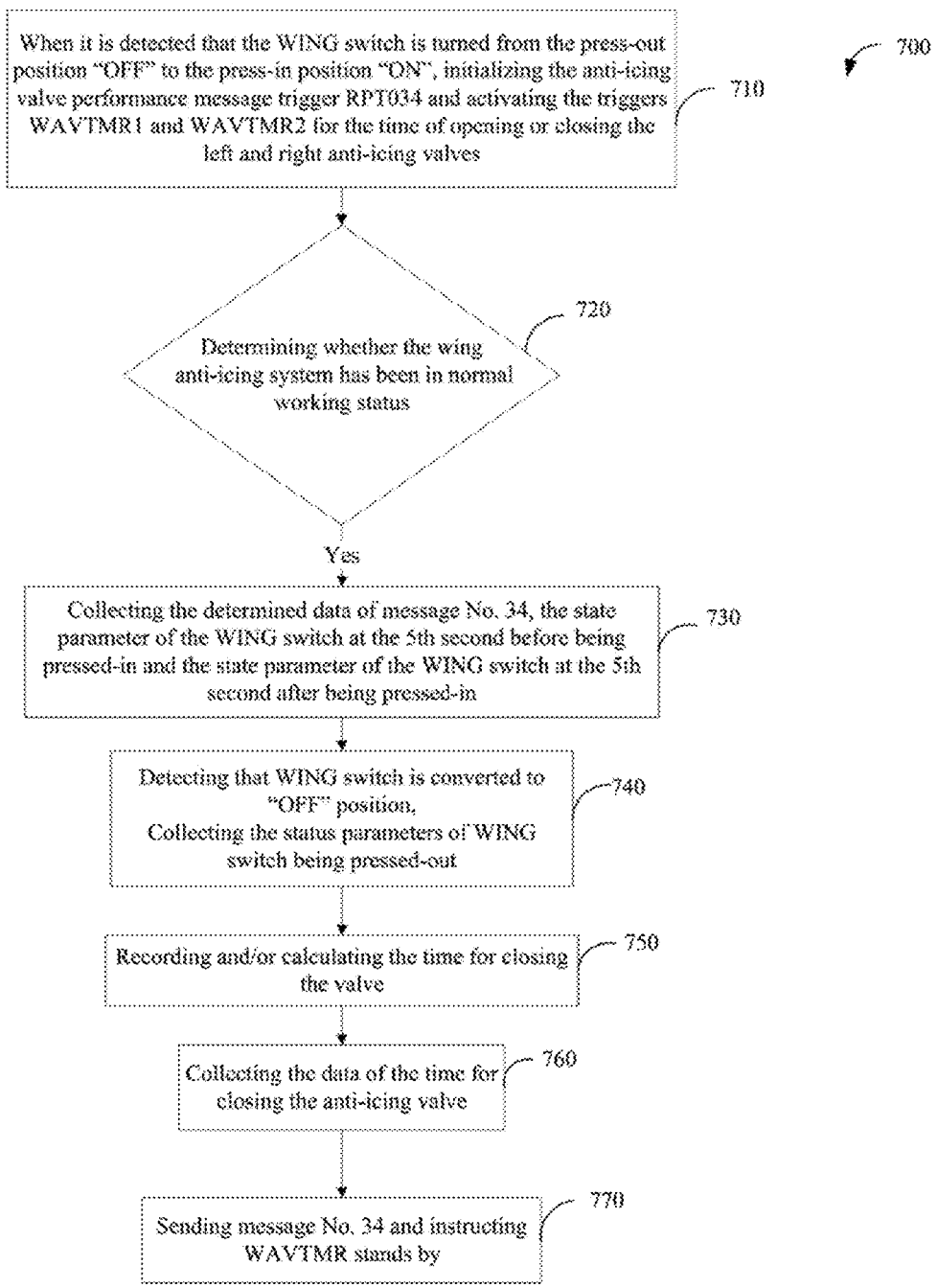
FIG. 7 is a flow chart illustrating a method for generating the anti-icing valve performance message according to one embodiment of the present invention.

FIG. 7 is a flow chart illustrating a method for generating the anti-icing valve performance message according to one embodiment of the present invention. As shown in FIG. 7, the method 700 of generating the anti-icing valve performance message, i.e., message No. 34, comprises: at step 710, when it is detected that the WING switch is turned from the press-out position "OFF" to the press-in position "ON", initializing the anti-icing valve performance message trigger RPT034 and activating the triggers WAVTMR1 and WAVTMR2 for the time of opening or closing the left and right anti-icing valves. According to one embodiment of the present invention, the trigger may be a process used for completing a specific function or a separate hardware relating to a specific function.

Figure 8:
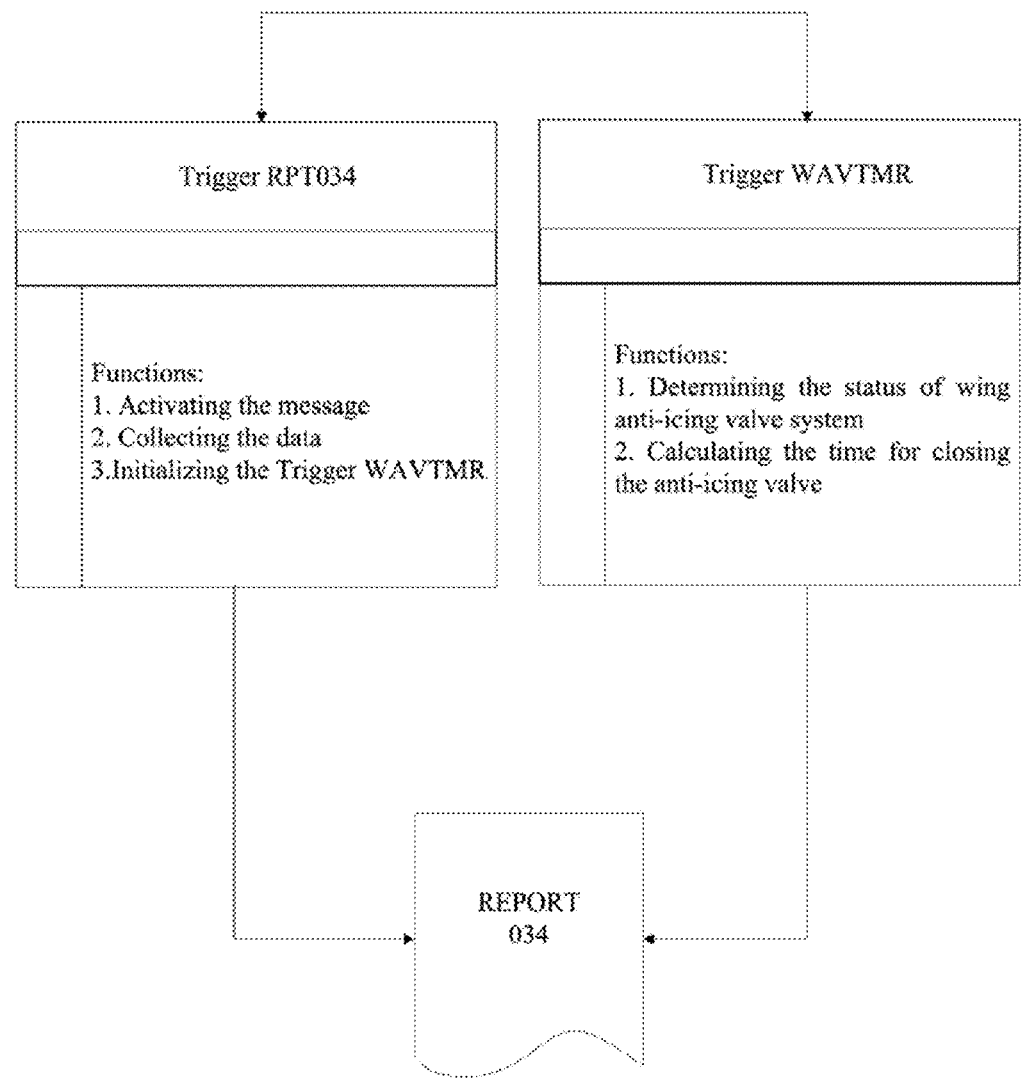
FIG. 8 is a scheme illustrating the relationship between the triggers RPT034 and WAVTMR and the message No. 34 according to one embodiment of the present invention.

FIG. 8 is a scheme illustrating the relationship between the triggers RPT034 and WAVTMR and the message No. 34 according to one embodiment of the present invention. As shown in FIG. 8, RTP034 is a main process for activating to generate the message No. 34, collecting other parameters except the time for closing or opening the anti-icing valve, and initializing the trigger WAVTMR. The trigger WAVTMR may be used for determining the state of the wing anti-icing valve and obtaining the time for closing or opening the anti-icing valve. The data of the triggers RTP034 and WAVTMR may be combined to generate the message No. 34.

Figure 9:
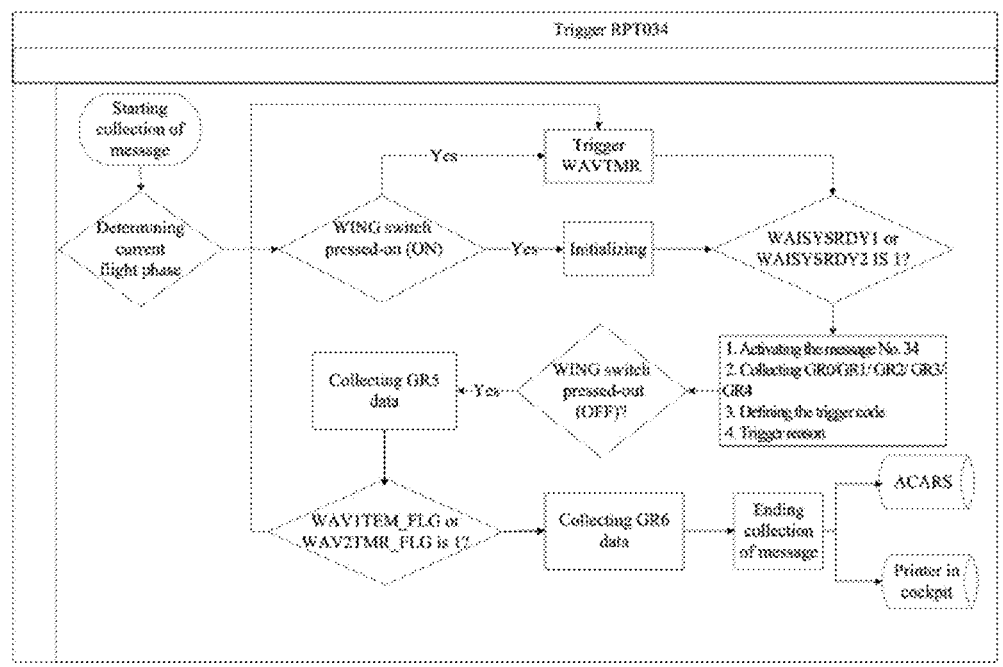
FIG. 9 is a flow chart illustrating the operation of the trigger RTP034 according to one embodiment of the present invention.
Figure 10:
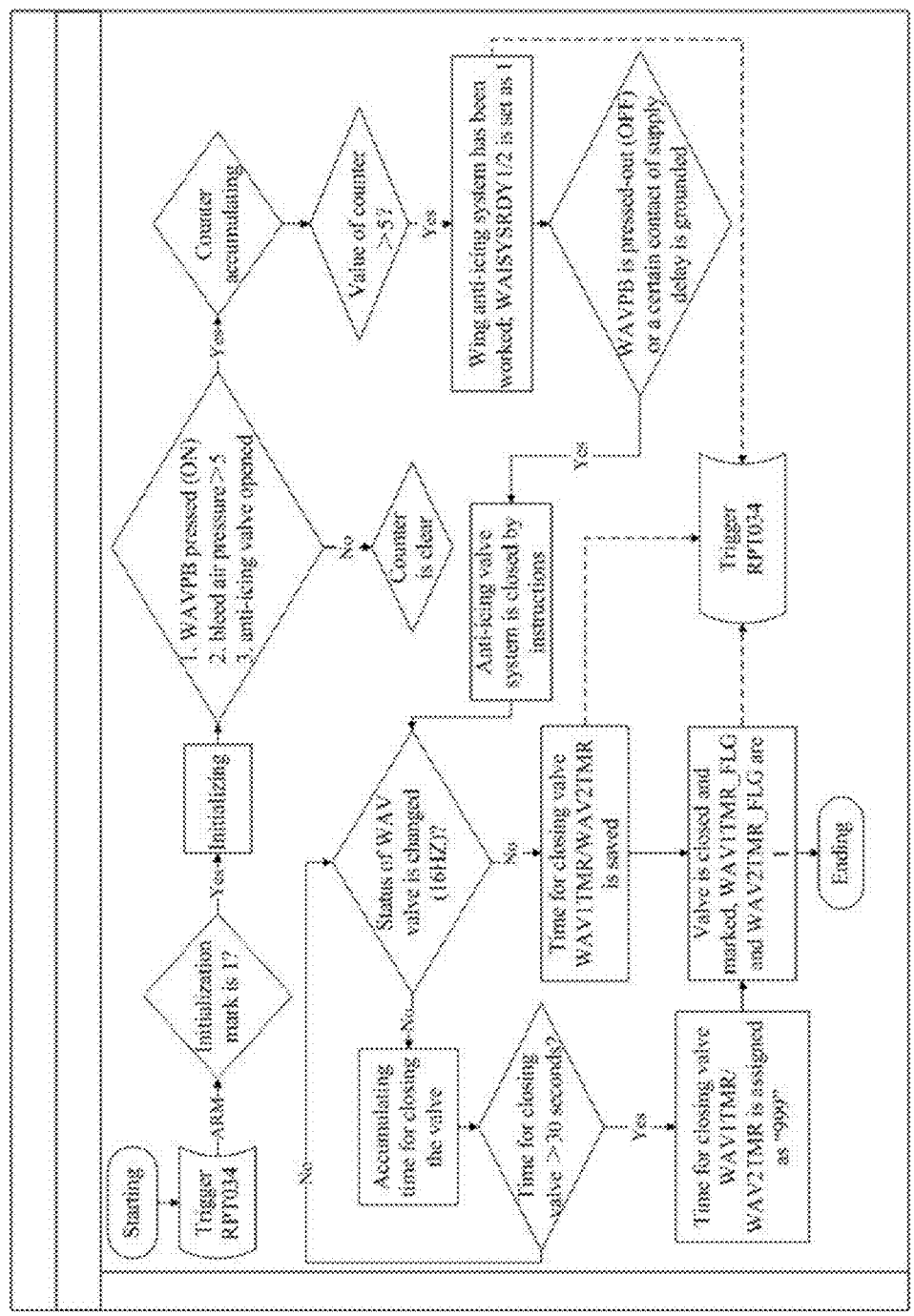
FIG. 10 is a flow chart illustrating the operation of the trigger WAVTMR according to one embodiment of the present invention.

FIG. 9 is a flow chart illustrating the operation of the trigger RTP034 according to one embodiment of the present invention. FIG. 10 is a flow chart illustrating the operation of the trigger WAVTMR according to one embodiment of the present invention. Hereinafter, the anti-icing valve performance massage, i.e., the method of generating the message No 34, will be further illustrated by referring to FIGS. 7-10.

Referring to FIGS. 7-10, at step 720, trigger WAVTMR determines whether the wing anti-icing system has been in normal working status; if yes, the mark "WAISYSRDY1" and/or "WAISYSRDY2" is 1. Specifically, the trigger RPT034 activates trigger WAVTMR and then determine whether WAVTMR needs to be initialized. If the initialization mark is "1", the trigger WAVTMR is initialized. If WAVTMR has been initialized previously and is re-activated only, the initialization mark is "0", the trigger WAVTMR needs not to be initialized and the next step proceeds directly. Next, trigger WAVTMR determines whether the anti-icing system is working normally. According to one embodiment of the present invention, the normal working conditions are as follows: (1) the WING switch is held at the ON position; (2) the pressure of the bleed air piping is greater about 15 psi; (3) the position switch of the anti-icing valve shows that the anti-icing valve is at the "non-close" position (in this embodiment, the duration for closing is recorded and the operations of recording the time for opening is similar); and (4) the lasting time is greater than about 5 seconds. According to one embodiment of the present invention, trigger WAVTMR comprises a counter. If the above conditions (1)-(3) is met, the counter accumulates 1 per second; if not met, the counter is clear. When the value of counter is greater than or equivalent to 5, determining that the anti-icing system has been worked, and the mark "WAISYSRDY1" and/or "WAISYSRDY2" is set as "1".

Referring to FIGS. 7 and 9, at step 730, trigger RPT034 determines the state of "WAISYSRDY1" and/or "WAISYSRDY2", and finds that one of them is set as "1", and then collects the determined data of message No, 34, the state parameter of the WING switch at the 5th second before being pressed-in and the state parameter of the WING switch at the 5th second after being pressed-in.

Referring to FIGS. 7 and 9, at step 740, trigger RPT034 detects that WING switch is converted to DOFF" position, i.e., from the press-in position to the press-out position, and then collects the status parameters of WING switch being pressed-out.

Referring to FIGS. 7 and 9, at step 750, trigger WAVTMR records and/or calculates the time for closing, and "WAV1TMR_FLG" and "WAV2TMR_FLG" are set as "1" after recording and/or calculating. Specifically, when trigger WAVTMR detects that WING switch is at "OFF" position (or that a certain contact of the valve supply relay is grounded, for example, the event of that the anti-icing valve is forced to close when grounding for 30 seconds), determining whether the anti-icing valve system will be closed according to instructions. Next, trigger WAVTMR detects whether the state of the anti-icing valve is converted from "open" to "close" at 16 Hz or other time intervals. If it is not converted, the time for closing the valve accumulated. When the accumulated value is greater than 30 seconds, it may be determined that there is failure in the valve, and the time for closing the valve is assigned as "999". If it is converted, the time for closing the valve will be saved in WAVTMR1/WAVTMR2 and the valve close mark will be set as "1" at the same time. Then, if the time for closing the valve is "999" or the valve close mark is "1" "WAV1TMR_FLG" and "WAV2TMR_FLG" are set as "1", indicating that the process of calculating the time for closing is over.

Referring to FIGS. 7 and 9, at step 760, if trigger RPT034 detects that "WAV1TMR_FLG" and "WAV2TMR_FLG" are set as "1", the data of the time for closing the anti-icing valve will be collected from WAVTMR1 and WAVTMR2.

Figure 11:
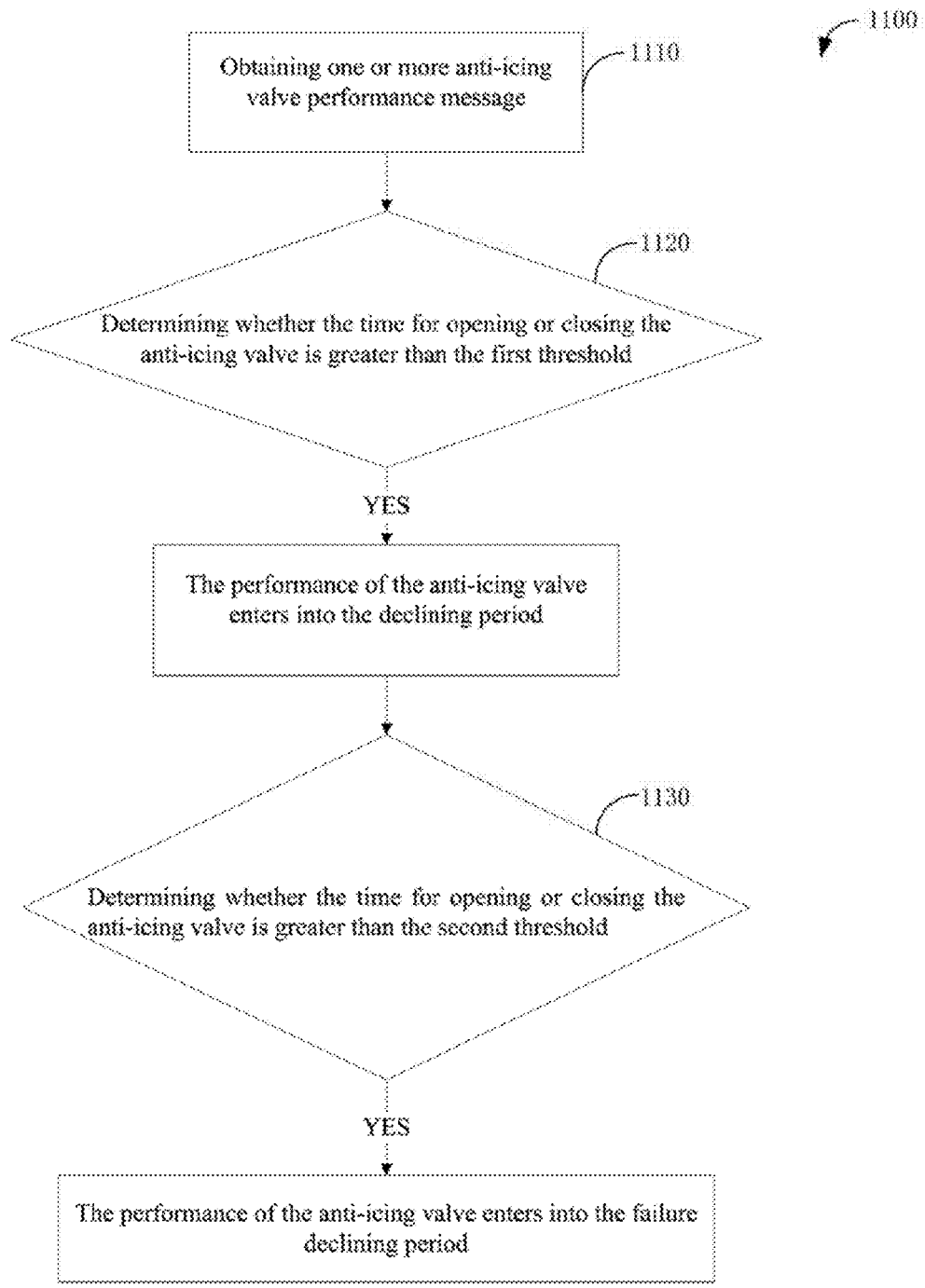
FIG. 11 is a flow chart illustrating a method for monitoring the wing anti-icing valve according to one embodiment of the present invention.

At step 770, trigger RPT034 completes the collection of the message data, sends message No. 34 and instructs WAVTMR stands by. According to one embodiment of the present invention, once the message on the ground is triggered, the trigger code is "1000", the trigger reason is "GND TEXT" in ground testing and the objects to which the message is sent are ACARS and printer; after triggering the message in the air, the trigger code is "4000", the trigger reason is "FLT OPER" in flight operation and the object to which the message is sent are ACARS FIG. 11 is a flow chart illustrating a method for monitoring the wing anti-icing valve according to one embodiment of the present invention. As shown in FIG. 11, the method 1100 for monitoring the wing anti-icing valve comprises: at step 1110, obtaining one or more anti-icing valve performance message, wherein the anti-icing valve performance message comprises the time for opening or closing. The embodiments of FIGS. 4-10 as described above may be applied to the method of this embodiment, to generate anti-icing valve performance message, i.e., message No. 34. This method may be applied to the anti-icing valve performance assessment device 504 in the embodiment as shown in FIG. 5. Indeed, the anti-icing valve performance messages including the time for opening or closing the anti-icing valve obtained by other methods may also be applied in the present invention.

At step 1120, determining whether the time for opening or closing the anti-icing valve is greater than the first threshold. If the time for opening or closing the anti-icing valve is greater than the first threshold it may be determined that the performance of the anti-icing valve enters into the declining period. The first threshold may be determined according to the time for opening or closing the anti-icing valve in good conditions, for example, the time for opening or closing the anti-icing valve in the factory-fresh condition. According to one embodiment of the present application, for the anti-icing valve whose time for opening or closing is less than 1 second in good conditions, the first threshold is 4 seconds.

At step 1130, determining whether the time for opening or closing the anti-icing valve is greater than the second threshold. If the time for opening or closing the anti-icing valve is greater than the second threshold, it may be determined that the performance of the anti-icing valve enters into the failure period. Wherein, the second threshold is greater than the first threshold. According to one embodiment of the present application, for the anti-icing valve whose time for opening or closing is less than 1 second in good conditions, the second threshold is 7-8 seconds. According to one embodiment of the present application, if the anti-icing valve whose time for opening or closing is less than 1 second in good conditions is 6 seconds, it indicates that that anti-icing valve has entered into the serious reclining period and may enter into the failure period at any time.

According to one embodiment of the present application, in order to exactly reflect the performance changing of the anti-icing valve and avoid misinformation alarm, step 1120 further comprises: when the time for opening or closing the anti-icing valve in two consecutive anti-icing valve performance messages is greater than the first threshold, or the time for opening or closing the anti-icing valve in two of three consecutive anti-icing valve performance messages is greater than the first threshold, or the time for opening or closing the anti-icing valve in three of five consecutive anti-icing valve performance messages is greater than the first threshold, it may be then determined that the performance of the anti-icing valve enters into the declining period.

According to one embodiment of the present invention, step 1130 further comprises: when the time for opening or closing the anti-icing valve in two consecutive anti-icing valve performance messages is greater than the second threshold, or the time for opening or closing the anti-icing valve in two of three consecutive anti-icing valve performance messages is greater than the second threshold, or the time for opening or closing the anti-icing valve in three of five consecutive anti-icing valve performance messages is greater than the second threshold, it may be then determined that the performance of the anti-icing valve enters into the failure period.

According to one embodiment of the present invention, since the anti-icing valve is pushed to be opened by pressure difference, the bleed air pressure may influence the time for opening or closing the valve. Therefore, the time for opening or closing the anti-icing valve may be revised by the pressure in pipe, to accurately reflect the performance of the anti-icing valve itself.

Figure 12:
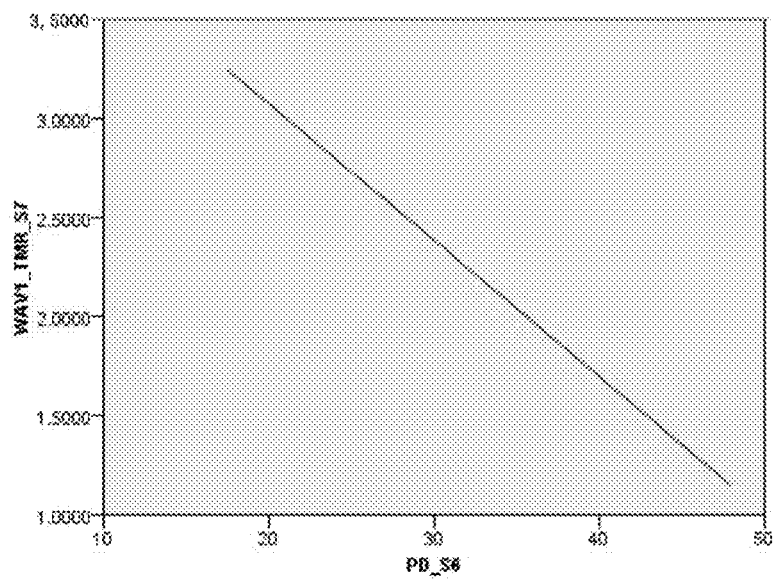
FIG. 12 is a schematic illustrating the change regularity of the bleed air pressure and the time for opening or closing the anti-icing valve according to one embodiment of the present invention.
Figure 13:
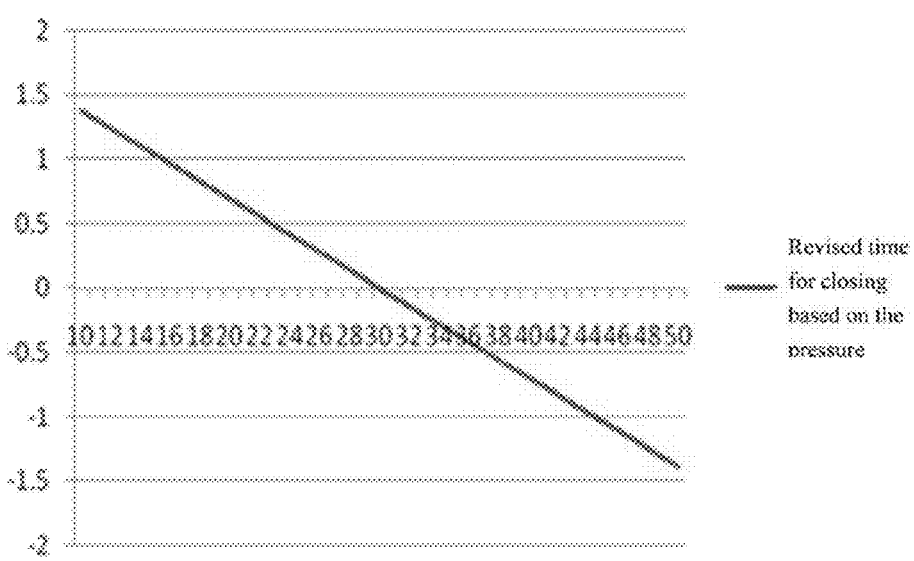
FIG. 13 is a schematic illustrating the change regularity (normalized to 30 PSI) of the bleed air pressure and the time for opening or closing the anti-icing valve according to one embodiment of the present invention.

FIG. 12 is a schematic illustrating the change regularity of the bleed air pressure and the time for opening or closing the anti-icing valve according to one embodiment of the present invention. As shown in FIG. 12, according to the research conducted by the inventor of the present invention, there is a good linear relationship between the bleed air pressure and the increment of the time for opening or closing. FIG. 13 is a schematic illustrating the change regularity (normalized to 30 PSI) of the bleed air pressure and the time for opening or closing the anti-icing valve according to one embodiment of the present invention. Indeed, it may also be normalized to other pressure values.

According to one embodiment of the present invention, the time for opening or closing the anti-icing valve may be revised according to the revised formula of the bleed air pressure:

$$\text{time revised} = \text{time before revised} + (a*(PD)+b);$$

wherein PD refers to the bleed air pressure, a and b are revised parameters. According to one embodiment of the present invention, a is −0.069 and b is 2.07. It should be noted by persons skilled in the art that the values of a and b may be different for different anti-icing valve system. The above values are provided to illustrate.

Backing to FIG. 11 or at step 1140, assessing whether the performance of the anti-icing valve is changed substantially by referring to the history data of the time for opening or closing the anti-icing valve. If the performance of the anti-icing valve is changed substantially, it may be determined that the performance of the anti-icing valve enters into the declining period.

Figure 14A:
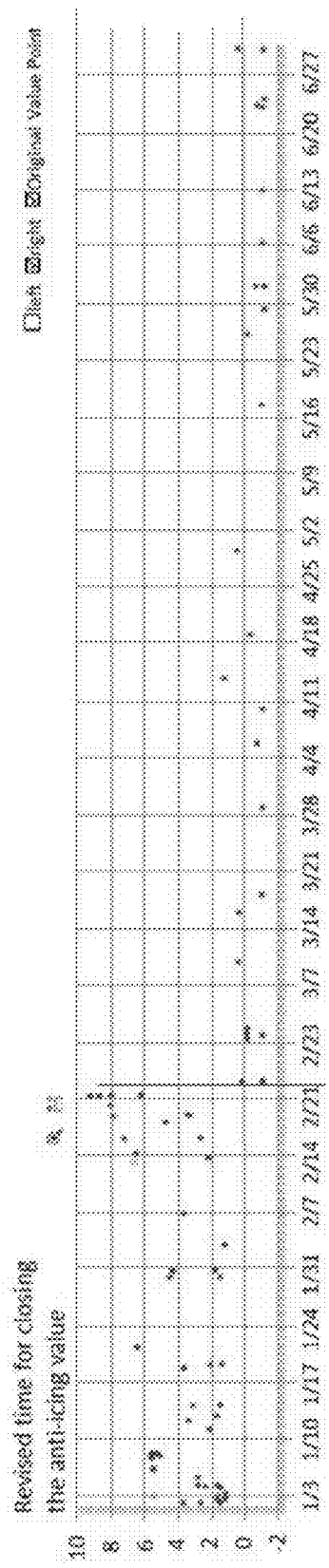
FIGS. 14A-14C are an example of maintaining the anti-icing valve according to one embodiment of the present invention.
Figure 14B:
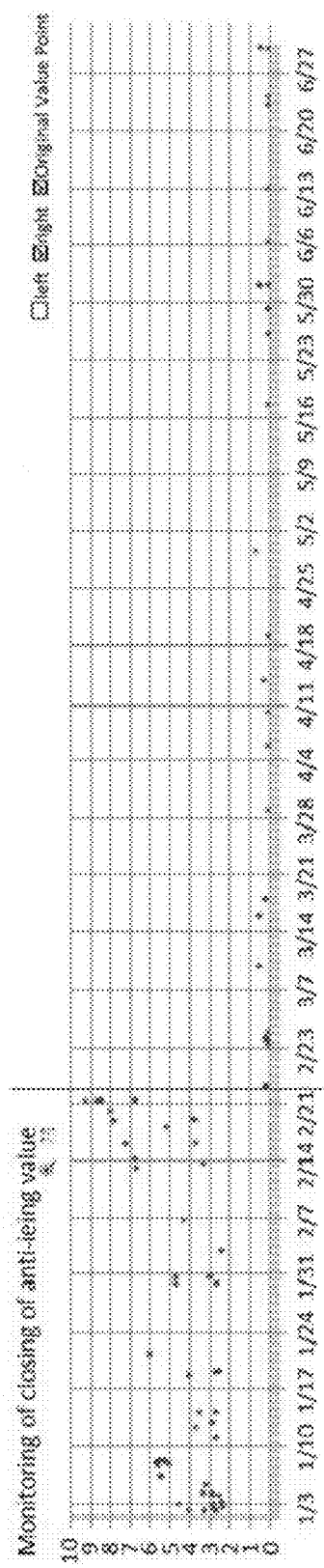
Figure 14C:
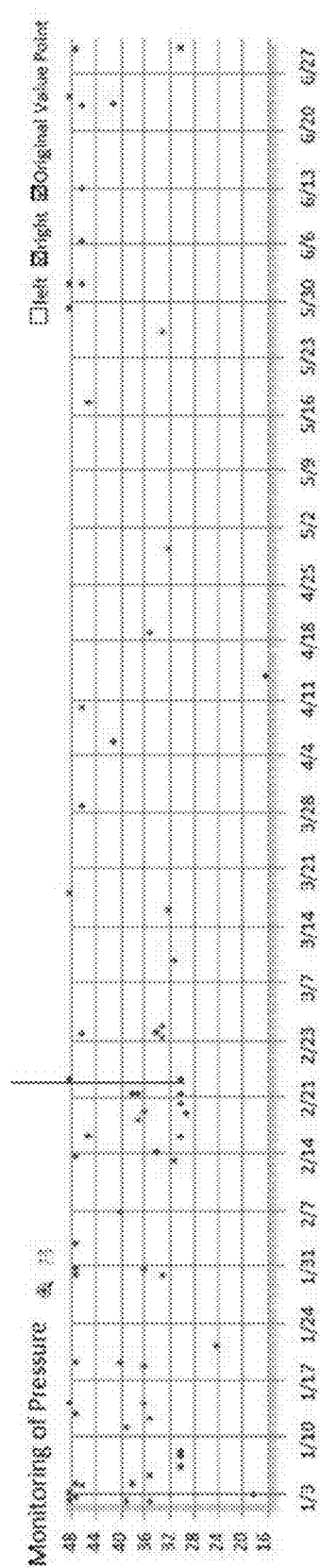

FIGS. 14A-14C are an example of maintaining the anti-icing valve according to one embodiment of the present invention, wherein at the time shown as the vertical line, the anti-icing valve is maintained and its performance is recovered. The examples shown in FIGS. 14A-14C are anti-icing valves before and after maintenance whose performances are in different states, therefore, the technical solution of the present invention may be further illustrated by the examples shown in FIGS. 14A-14C.

According to one embodiment of the present invention, determining whether the performance of the anti-icing valve is changed substantially by examining independent samples. The data in the following Tables 1 and 2 illustrate the independent samples before and after maintenance:

Set of Statistics

TABLE 1

| WAV2_GROP | | N | AVERAGES | standard deviation | standard deviation of the averages |
|---|---|---|---|---|---|
| WAV2_TMR_S7 | Before maintenance | 57 | 4.333333 | 1.8512006 | .2451975 |
| | After maintenance | 26 | .120192 | .1870186 | .0366774 |

Independent Samples Examination

TABLE 2

| | | Levene Examination on Variance Equation | | t examination on mean equation | | | | | |
|---|---|---|---|---|---|---|---|---|---|
| | | | | | | Sig. (both | | Mean | Standard | 95% Confidence region of difference | |
| | | F | Sig. | T | df | sides) | difference | error | Lower limit | Upper limit |
| WAV1_TMR_S7 | Equal variances assumed | 43.014 | .000 | 11.540 | 81 | .000 | 4.2131410 | .3650960 | 3.4867145 | 4.9395676 |
| | Equal variances not assumed | | | 16.994 | 58.468 | .000 | 4.2131410 | .2479255 | 3.7169489 | 4.7.93332 |

According to the results of Tables 1 and 2, the performances of anti-icing valves before and after maintenance are very different and almost cannot be deemed as relevant. It fully illustrates that the independent samples examination may be applied in the present invention to assess whether the performance of the anti-icing valve is changed substantially.

According to one embodiment of the present invention, determining whether the performance of the anti-icing valve is changed substantially according to the change trend with respect to the time for opening or closing the anti-icing valve. Also referring to the embodiment of FIG. 14, the time for opening or closing the anti-icing valve increase rapidly in a period before maintenance, and the change trend goes bad at a high speed. Therefore, the change of the change trend may also used to assess the performance of the anti-icing valve.

According to one embodiment of the present invention, the performance of the anti-icing valve is determined by calculating the linear fitting slope reflecting changes of the time for opening or closing the anti-icing valve.

It is assumed that the time rolling window comprises M time points, the time TSR is the abscissa axis, the revised time for opening or closing the anti-icing valve is ordinate axis, and the slope of the most adjacent M timings is calculated. If the slope changes, for example, increases rapidly, it illustrates that the performance of the anti-icing valve is changed substantially.

The size of the rolling window, i.e., the number M of the timings to be calculated, depends on a plurality of factors, such as interval between two measurements, control strategy and the like. The number M is too small, the change of the slope may be influenced by the normal fluctuation, and many misinformation alarms will occur. If the number M is too large, although the changing trend is relatively accurate, the timeliness of the present invention will be decreased and warnings cannot be issued in a timely manner. Therefore, the size of the rolling window is important to this method. According to one embodiment of the present invention, M is valued as 540, preferably 7. When the changing of the slope exceeds 1.5-2 times of standard variance, it can be determined that the performance of the anti-icing valve is changed substantially.

Backing to FIG. 11, at step 1150, if the performance of the anti-icing valve enters into the declining period, seriously declining period or failure period, estimating the probable failure time. According to one embodiment of the present invention, when the performance of the anti-icing valve enters into the declining period, continuously monitoring the change of changing trend of the time for opening or closing the anti-icing valve, if the time for opening or closing the anti-icing valve reaches the second threshold or a threshold of the seriously declining period, the timing that the performance of the anti-icing valve enters into the seriously declining period or failure period may be estimated, and thus the probable timing of that the failure is taken place in the anti-icing valve may be estimated.

Figure 15:
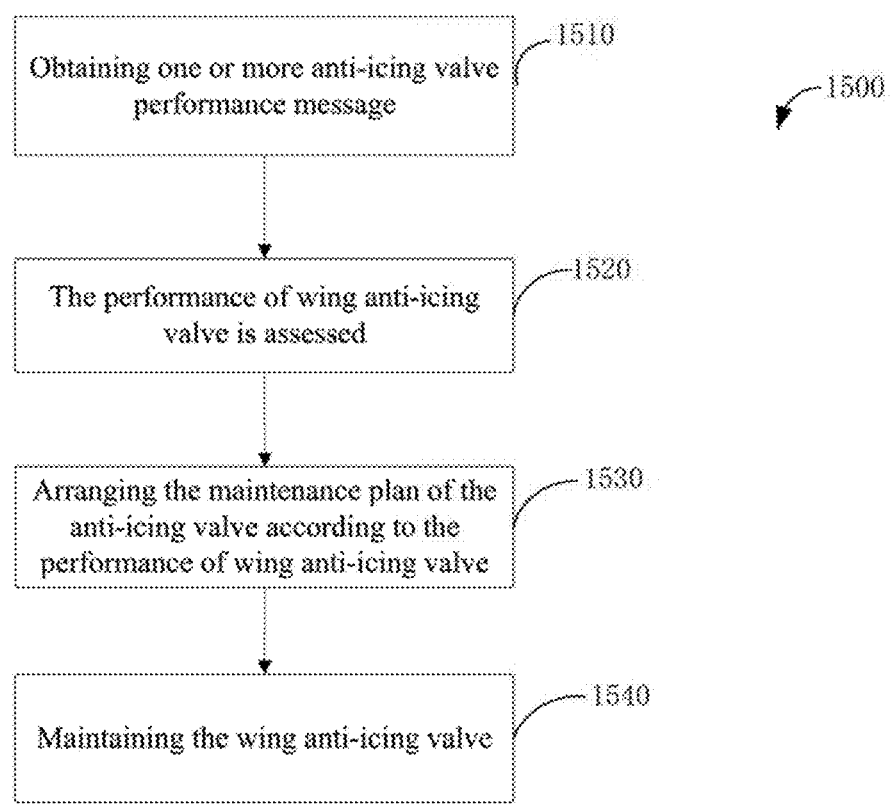
FIG. 15 is a flow chart illustrating a method for maintaining the wing anti-icing valve according to one embodiment of the present invention.

FIG. 15 is a flow chart illustrating a method for maintaining the wing anti-icing valve according to one embodiment of the present invention. As shown in FIG. 15, the method for maintaining the wing anti-icing valve 1500 comprises: at step 1510, obtaining one or more anti-icing valve performance message, wherein the anti-icing valve performance message comprises at least the time for opening or closing the anti-icing valve. The embodiments of FIG. 4-10 as stated above may be applied in the method of this embodiment to generate the anti-icing valve performance message, i.e., message No. 34. This method may be applied in the anti-icing valve performance assessment device 504 in the embodiment as shown in FIG. 5. Indeed, anti-icing performance message comprising time for opening or closing via other ways also may be applied in the present invention.

At step 1520, the performance of wing anti-icing valve is assessed. Both the methods for assessing the performance of the anti-icing valve and estimating the timing that failure occurs in the anti-icing valve in the embodiments may be applied in step 1520 to assess the performance of the anti-icing valve. Indeed, other methods for assessing the performance of the anti-icing valve also may be applied in this step.

At step 1530, arranging the maintenance plan of the anti-icing valve according to the performance of wing anti-icing valve; and at step 1540, maintaining the wing anti-icing valve. Before the step 1530, the method may comprises another step of estimating when a failure of the anti-icing valve might happen.

The advantageous effects of the present invention: compared with the prior arts, the present invention fills the blank of the prior arts. In one embodiment of the present invention, automatically collecting the operational state of wing anti-icing valve and transmitting to the ground station or automatically printing via air-ground data link solves the problem of collecting the state data of anti-icing valve and further achieve the following technical effects: determining and monitoring the state of wing anti-icing valve, reducing the operational cost of the airline, and improving the flight safety.

The above embodiments are only described for illustrating the present invention, and do not mean to limit the present invention. A person with ordinary skill in relevant art may make various changes and variations without departing from the scope of the present invention. Therefore, all equivalent technical solutions shall also fall within the disclosure of the present invention.

We claim:

1. A system for monitoring a wing anti-icing valve having an open position and a closed position, the system comprising:
   a time recording device configured to record at least one of (A) a time between a first event of turning a WING switch from a press-out position to a press-in position and a second event of the wing anti-icing valve moving to the open position, and (B) a time between a third event of turning a WING switch from a press-in position to a press-out position and a fourth event of the wing anti-icing valve moving to the closed position;
   a data acquisition device configured to obtain the at least one of the time between the first and second events and the time between the third and fourth events recorded by the time recording device; and
   a message generation device configured to generate a wing anti-icing valve performance message according to the at least one of the time between the first and second events and the time between the third and fourth events obtained by the data acquisition device.

2. The system of claim 1, wherein the time recording device comprises a timer configured to record the time between the third event and the fourth event.

3. The system of claim 1, wherein the wing anti-icing valve comprises a sensor configured to detect whether the anti-icing valve is in the open position; wherein the time recording device comprises a timer configured to record the time between the first event and the second event.

4. The system of claim 1, further comprising a wing anti-icing valve performance assessment device configured to receive the wing anti-icing valve performance message and assess the performance of the wing anti-icing valve according to the at least one of the time between the first and second events and the time between the third and fourth events in the wing anti-icing valve performance message.

5. The system of claim 4, wherein the wing anti-icing valve performance assessment device refers to history data of the at least one of the time between the first event and second event and the time between the third event and the fourth event.

6. The system of claim 5, wherein the wing anti-icing valve performance assessment device estimates a failure time of the wing anti-icing valve.

7. The system of claim 4, further comprising a communication device configured to transmit the wing anti-icing valve performance message to the wing anti-icing valve performance assessment device.

8. The system of claim 4, wherein the wing anti-icing valve performance message comprises a revised time for at least one of (A) the time between the first event and the second event, and (B) the time between the third event and the fourth event, wherein the revised time is calculated using a revision formula as follows:
   the revised time=the time before revised+(a*(PD)+b);
   wherein PD refers to the bleed air pressure, a and b are revised parameters.

9. The system of claim 8, wherein the wing anti-icing valve performance message comprises: a status before the first event, a status after the first event, a status during the second event; or, comprises: a status before the third event, a status during the fourth event; wherein the statuses each comprise at least a bleed air pressure of an engine.

10. The system of claim 9, wherein the wing anti-icing valve performance assessment device determines whether the revised time for the at least one of (A) the time between the first event and the second event, and (B) the time between the third event and the fourth event is greater than a first threshold or a second threshold; wherein, the second threshold is greater than the first threshold.

11. The system of claim 9, wherein the wing anti-icing valve performance assessment device determines whether the revised time for the at least one of (A) the time between the first event and the second event, and (B) the time between the third event and the fourth event is changed substantially compared with the history data.

12. The system of claim 11, wherein the wing anti-icing valve performance assessment device determines whether the revised time for the wing anti-icing valve to move to the open position or closed position is changed substantially compared with the history data by examining independent samples.

13. The system of claim 11, wherein the wing anti-icing valve performance assessment device determines whether the revised time for the at least one of (A) the time between the first event and the second event, and (B) the time between the third event and the fourth event is changed substantially compared with the history data by a changing trend of a linear fitting slope.

14. A method for monitoring a wing anti-icing valve having an open position and a closed position, comprising:
   recording a time for the wing anti-icing valve to move to the open position or closed position;
   obtaining the time for the wing anti-icing valve to move to the open position or closed position recorded by the time record device;
   generating a wing anti-icing valve performance message according to the time for the anti-icing valve to move to the open position or closed position obtained by the data acquisition device; and
   receiving the wing anti-icing valve performance message;
   referring to history data of the time for the wing anti-icing valve to move to the open position or closed position; and
   assessing the performance of the wing anti-icing valve according to the time for the wing anti-icing valve to move to the open position or the closed position in the wing anti-icing valve performance message.

15. The method of claim 14, wherein the step of recording the time for the wing anti-icing valve to move to the closed position comprises recording a time from when a WING switch is turned from a press-in position to a press-out position to the time for the wing anti-icing valve to move to the closed position.

16. The method of claim 14, wherein the step of recording the time for the wing anti-icing valve to move to the open position comprises recording a time from when a WING switch is turned from a press-out position to a press-in position to the time for the wing anti-icing valve to move to the open position.

17. The method of claim 14, further comprising recording a time between when a WING switch is turned from a press-in position to a press-out position and when the wing anti-icing valve is moved to the closed position or a time between when a WING switch is turned from a press-out position to a press-in position and when the wing anti-icing valve is moved to the opening open position.

18. The method of claim 14, further comprising estimating a failure time of the wing anti-icing valve.

19. The method of claim 14, further comprising transmitting the wing anti-icing valve performance message via an air-ground data link.

20. The method of claim 14, further comprising revising the time for the wing anti-icing valve to move to the open position or closed position using a revisions formula, wherein the revision formula is as follows:

the revised time=the time before revised+(a*(PD)+b);
wherein PD refers to the bleed air pressure, a and b are revised parameters.

21. The method of claim 20, wherein the wing anti-icing valve performance message comprises: a status before a WING switch is pressed-in, a status after the WING switch pressed-in, a status when the WING switch is pressed-out and the time for the wing anti-icing valve to move to the closed position; or, comprises: a status before a WING switch is pressed-in, status after the WING switch is pressed-in and the time for the wing anti-icing valve to move to the open position; wherein each of the statuses comprises at least a bleed air pressure of an engine.

22. The method of claim 20, wherein the step of assessing the performance of the wing anti-icing valve comprises determining whether the revised time for the wing anti-icing valve to move to the open position or closed position is greater than a first threshold or a second threshold; wherein, the second threshold is greater than the first threshold.

23. The method of claim 20, wherein the step of assessing the performance of the wing anti-icing valve comprises determining whether the revised time for the wing anti-icing valve to move to the open position or closed position is changed substantially compared with history data.

24. The method of claim 23, wherein the step of determining whether the revised time for the anti-icing valve to move to the open position or closed position is changed substantially compared with the history data comprises determining whether the revised time for the wing anti-icing valve to move to the open position or closed position is changed substantially compared with the history data by examining independent samples.

25. The method of claim 23, wherein the step of determining whether the revised time for the wing anti-icing valve to move to the open position or closed position is changed substantially compared with the history data comprises determining whether the revised time for opening or closing the wing anti-icing valve to move to the open position or closed position is changed substantially compared with the history data by a changing trend of a linear fitting slope.

26. The method of claim 21, wherein the wing anti-icing valve performance message comprises the time for the anti-icing valve to move to the closed position, wherein the step of generating the wing anti-icing valve performance message comprises:

determining whether the wing anti-icing valve has already worked properly;
collecting the status before the WING switch is pressed-in and the status after the WING switch is pressed-in;
collecting the status when the WING switch is pressed-out;
obtaining the time for the wing anti-icing valve to move to the closed position; and
generating the wing anti-icing valve performance message.

27. The method of claim 26, wherein the step of determining whether the wing anti-icing valve has already worked properly comprises: determining: (1) whether the WING switch is held at an ON position; (2) whether the pressure of the bleed air pipe is greater than 15 psi; (3) whether the position of the wing anti-icing valve is shown being at a "non closed" position; and (4) whether a lasting time is greater than about 5 seconds.

28. The method of claim 21, further comprising: determining a failure in the wing anti-icing valve if the time for the wing anti-icing value to move to the closed position is greater than 30 seconds.

29. A method for maintaining a wing anti-icing valve, comprising:

obtaining one or more wing anti-icing valve performance messages, wherein, the one or more wing anti-icing valve performance messages comprises at least one of (A) a time between a first event of turning a WING switch from a press-out position to a press-in position and a second event of the wing anti-icing valve moving to the open position, and (B) a time between a third event of turning a WING switch from a press-in position to a press-out position and a fourth event of the wing anti-icing valve moving to the closed position;
assessing the performance of the wing anti-icing valve;
arranging a maintenance plan for the wing anti-icing valve; and
maintaining the wing anti-icing valve.

* * * * *